UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

CYMENE DYE.

1,314,922.     Specification of Letters Patent.     Patented Sept. 2, 1919.

No Drawing.     Application filed September 19, 1917. Serial No. 192,211.

*To all whom it may concern:*

Be it known that I, CHESTER E. ANDREWS, a citizen of the United States, residing at Pittsburgh, in the county of Allegheny and State of Pennsylvania, have invented certain new and useful Cymene Dyes, of which the following is a specification.

The present invention relates to the production of dyes from cymene mono amin, by first converting the same into cymene diazonium chlorid and then coupling with an aromatic amino compound, or a salt of an amin in an acid solution, whereby the product of the coupling, for example mono amino cymene azo aromatic amino body or a salt thereof, *e. g.* the hydrochlorid, is produced.

The dyes produced, when starting with mono amino cymene (1-methyl-2-amino-4-isopropyl-benzene, or its isomer 1-methyl-3-amino-4-isopropyl-benzene) are in some respects similar to those produced by a somewhat analogous procedure, by reacting upon anilin, but the cymene dyes are in practically every instance, of a very much more brilliant and intense color, so that a smaller quantity of the dye is necessary to produce a given effect, and also by the use of these dyes, a more brilliantly colored fabric can be produced.

The first step in the operation is the diazotization of the cymene mono amin.

As a specific example of this procedure the following is given. Seven and one-half parts of the pure or crude cymene-mono-amin are dissolved in a mixture of 200 parts of cold water, water at ordinary room temperature being suitable, with 15 parts of hydrochloric acid of about 39% strength, and the mixture is at once cooled to 10° C. or below, in order to prevent decomposition. A solution of about three and one-half parts of sodium nitrate in 25 parts of water is then added, while the temperature is maintained at about 10° C. or below, and while stirring. This produces a solution of 1-methyl-4-isopropyl-2-diazonium chlorid, or 3-diazonium chlorid.

This solution is added to a molecular equivalent of an aromatic amin, or a salt thereof. For example it may be added to 12.5 parts of toluylene diamin dissolved in 150 parts of water and enough HCl to form the hydrochlorid of the toluylene diamin, which is soluble, the solution being maintained at about 10° C., or below, and stirring the solution while introducing the solution of the diazonium compound. The solution is then allowed to stand while stirring, at about 10° C. or below, until the reaction is complete. This may require about 2 hours, more or less, depending upon the purity of the materials and other factors. There is thereby produced the hydrochlorid of mono amino cymene azo toluylene-diamin, which salt constitutes the dye produced, and is of a very brilliant yellowish brown color. The dye (which is in solution) is separated, for example by "salting out" and is then dried. This may be used to dye fabrics or yarn or other textile material, in exactly the same way that the analogous dyes of this class are used.

If desired, sodium acetate may be added either before or during coupling in quantities sufficient to neutralize the strong mineral acid present and allow the coupling to proceed in the weak acetic acid produced thereby.

Various other amins besides toluylene-diamin can be used in this process, of which the following are noted: mono-amino-cymene, anilin, alpha- or beta-naphthyl-amin, the xylidins, toluidins, dimethyl anilin, meta phenylene diamin and the sulfonic acid derivatives of these amins and the derivatives of these sulfonic acids, such as sulfanilic acid, H-acid (1:8-amino-naphthol-3:6 disulfonic acid), K-acid (1:8-amino-naphthol-4:6 disulfonic acid), RR-acid (2:8-amonio-naphthol-3:6 disulfonic acid), 1-amino-8-naphthol-3.5-disulfonic acid, 2-naphthylamin-6-sulfonic acid, 2-naphthyl-amin-7-sulfonic acid and various others.

In general the sulfonic acids produce water soluble dyestuffs but in the case of the simple amins the dyestuffs may or may not be water soluble.

Those dyes which are soluble, produced in accordance with this invention, can readily be separated from the solution by the customary method of "salting out".

What I claim is:

1. A dyestuff comprising diazo-cymene coupled with an amino derivative of an aromatic hydrocarbon.

2. The herein described new class of dyestuffs comprising diazo-cymene coupled with an amino derivative of an aromatic body containing the naphthalene nucleus.

3. A dyestuff comprising diazo-cymene coupled with an amino sulfonic acid derivative of an aromatic hydrocarbon.

4. The herein described new class of dyestuffs comprising diazo-cymene coupled with an amino derivative of an aromatic body containing the naphthalene nucleus, at least one of the hydrogen atoms of said nucleus being replaced by the $HSO_3$ group.

In testimony whereof I affix my signature.

CHESTER E. ANDREWS.